(12) United States Patent
Taitler

(10) Patent No.: US 9,364,021 B2
(45) Date of Patent: Jun. 14, 2016

(54) METHOD FOR PREPARING MICRO-FOAM WHIPPED MILK FOR CAPPUCCINO OR A METHOD FOR WHIPPING OTHER LIQUIDS CONTAINING PROTEINS, USING AN APPARATUS

(75) Inventor: Isaac Taitler, Haifa (IL)

(73) Assignee: TAIROB LTD., Haifa (IL)

( * ) Notice: Subject to any disclaimer, the term of this patent is extended or adjusted under 35 U.S.C. 154(b) by 205 days.

(21) Appl. No.: 13/600,330

(22) Filed: Aug. 31, 2012

(65) Prior Publication Data

US 2013/0064941 A1 Mar. 14, 2013

Related U.S. Application Data

(60) Provisional application No. 61/573,548, filed on Sep. 9, 2011.

(51) Int. Cl.
| | |
|---|---|
| *A23P 1/16* | (2006.01) |
| *A23L 1/00* | (2006.01) |
| *A47J 31/44* | (2006.01) |
| *A01J 11/04* | (2006.01) |
| *A47J 43/10* | (2006.01) |
| *A23C 9/152* | (2006.01) |

(52) U.S. Cl.
CPC .. *A23P 1/16* (2013.01); *A01J 11/04* (2013.01); *A23C 9/1524* (2013.01); *A23L 1/0097* (2013.01); *A47J 31/44* (2013.01); *A47J 31/4485* (2013.01); *A47J 31/4496* (2013.01); *A47J 43/10* (2013.01); *A23C 2210/30* (2013.01)

(58) Field of Classification Search
CPC ...... A01J 11/12; A01J 11/04; A23C 2210/30; A23C 9/1524; A23L 1/0097; A23L 1/0008; A47J 31/4496; A47J 43/10; A47J 31/44; A47J 31/4485; A23P 1/16
USPC ................ 426/231, 564, 570, 594–596, 580, 426/519–522, 491; 366/143–149; 99/348, 99/352–353
See application file for complete search history.

(56) References Cited

U.S. PATENT DOCUMENTS

| | | | | |
|---|---|---|---|---|
| RE33,214 E | * | 5/1990 | Crocker et al. | 523/303 |
| 5,473,972 A | * | 12/1995 | Rizzuto et al. | 99/290 |
| 5,891,732 A | * | 4/1999 | Prins et al. | 436/24 |
| 2008/0008806 A1 | * | 1/2008 | Boussemart et al. | 426/519 |
| 2009/0007802 A1 | * | 1/2009 | Taitler | 99/453 |
| 2009/0107342 A1 | * | 4/2009 | Piscaer et al. | 99/323.1 |
| 2009/0281283 A1 | * | 11/2009 | Lejars et al. | 530/381 |
| 2010/0323068 A1 | * | 12/2010 | Gonus et al. | 426/99 |
| 2011/0203462 A1 | * | 8/2011 | Boussemart et al. | 99/453 |
| 2011/0262606 A1 | * | 10/2011 | Blondel et al. | 426/474 |
| 2012/0167781 A1 | * | 7/2012 | Lane et al. | 99/453 |
| 2012/0186462 A1 | * | 7/2012 | Breust | 99/466 |
| 2013/0209639 A1 | * | 8/2013 | Larson et al. | 426/474 |

* cited by examiner

*Primary Examiner* — Drew Becker

(57) ABSTRACT

A device is introduced for preparation of milk and other beverages in bar or restaurant environments. The device has the unique ability to generate a micro-foam which imparts a sweet taste to the beverage without use of sugar, that sweet taste being equivalent to adding a flat teaspoon of sugar to a traditional cup of cappuccino. The computerized device consists of sensors and a fine mesh that is pushed through the beverage by means of an actuator adapted for this purpose while imparting quantitative heat through the process.

14 Claims, 17 Drawing Sheets

FIG. 1 – PRIOR ART

Figure 1:
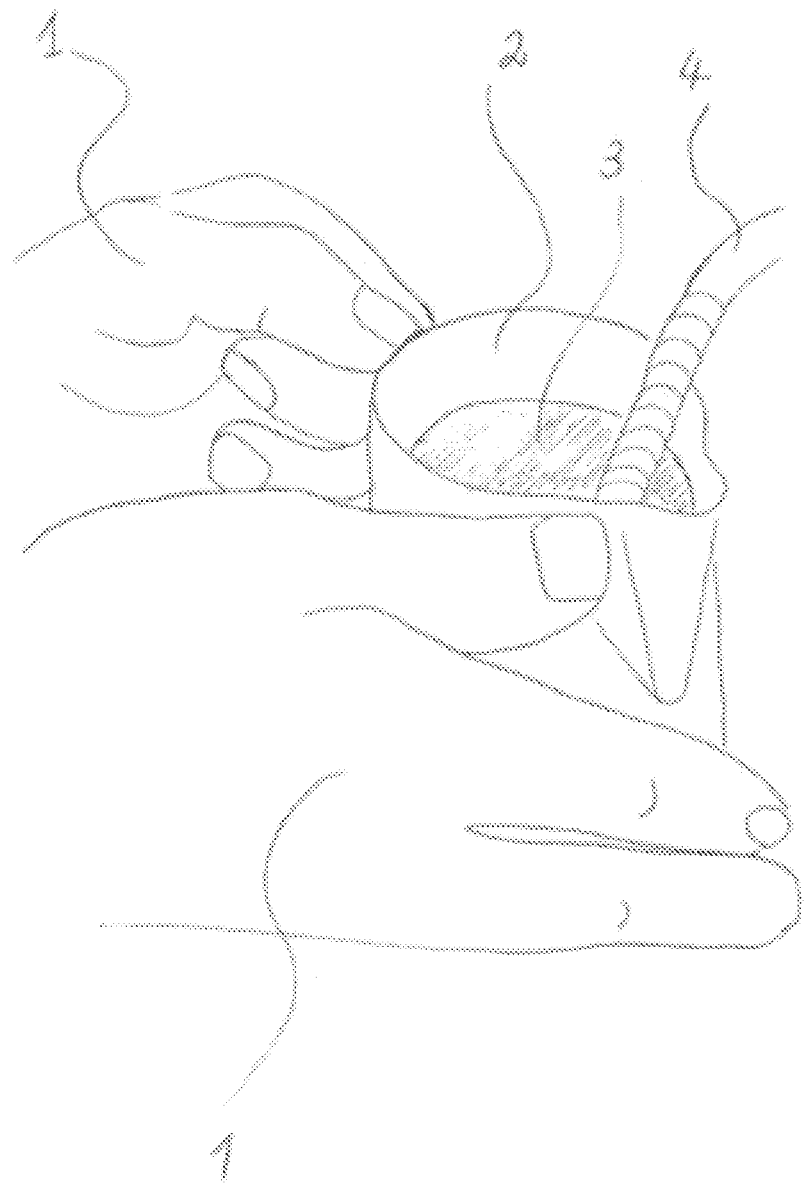

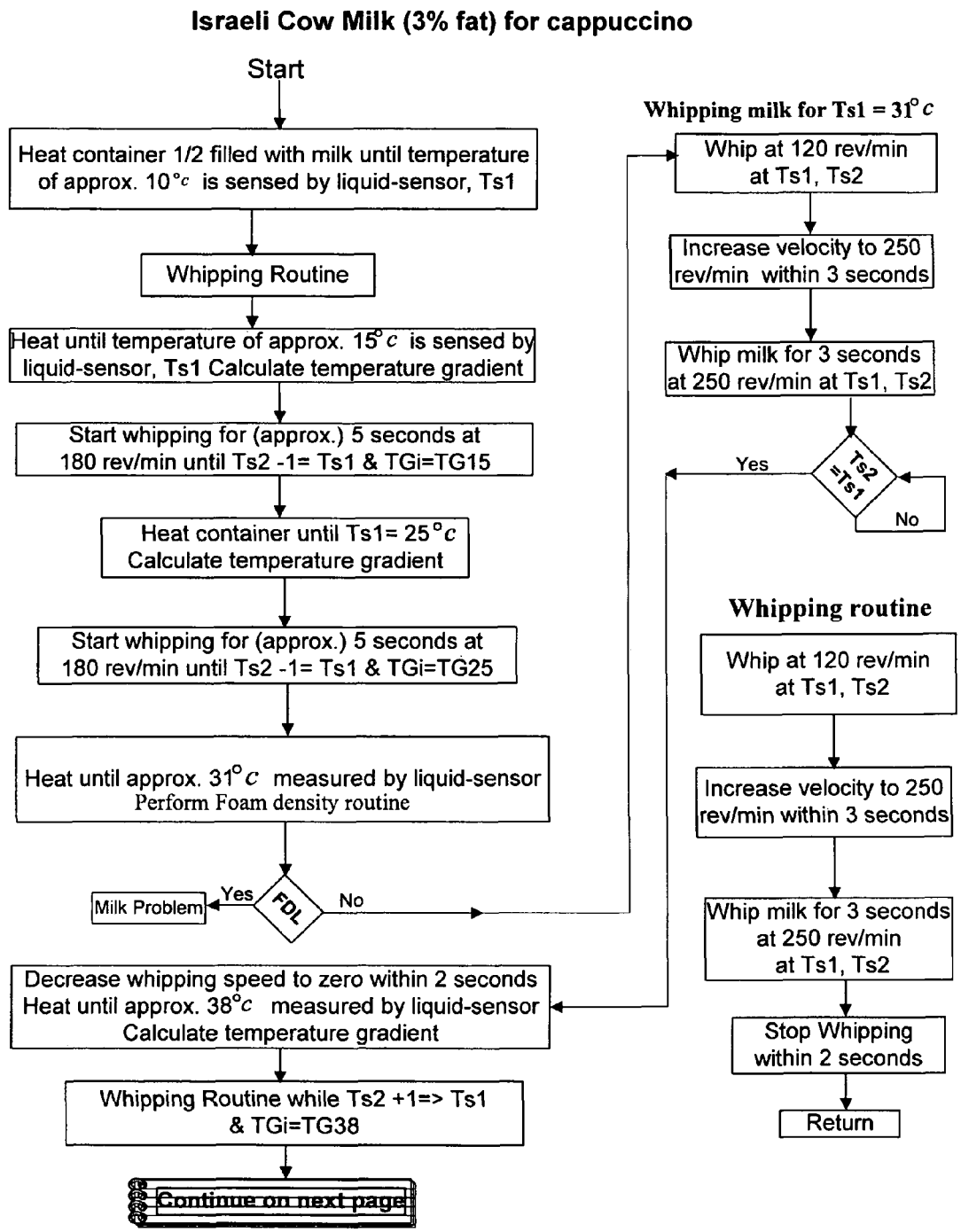
FIG 11-a

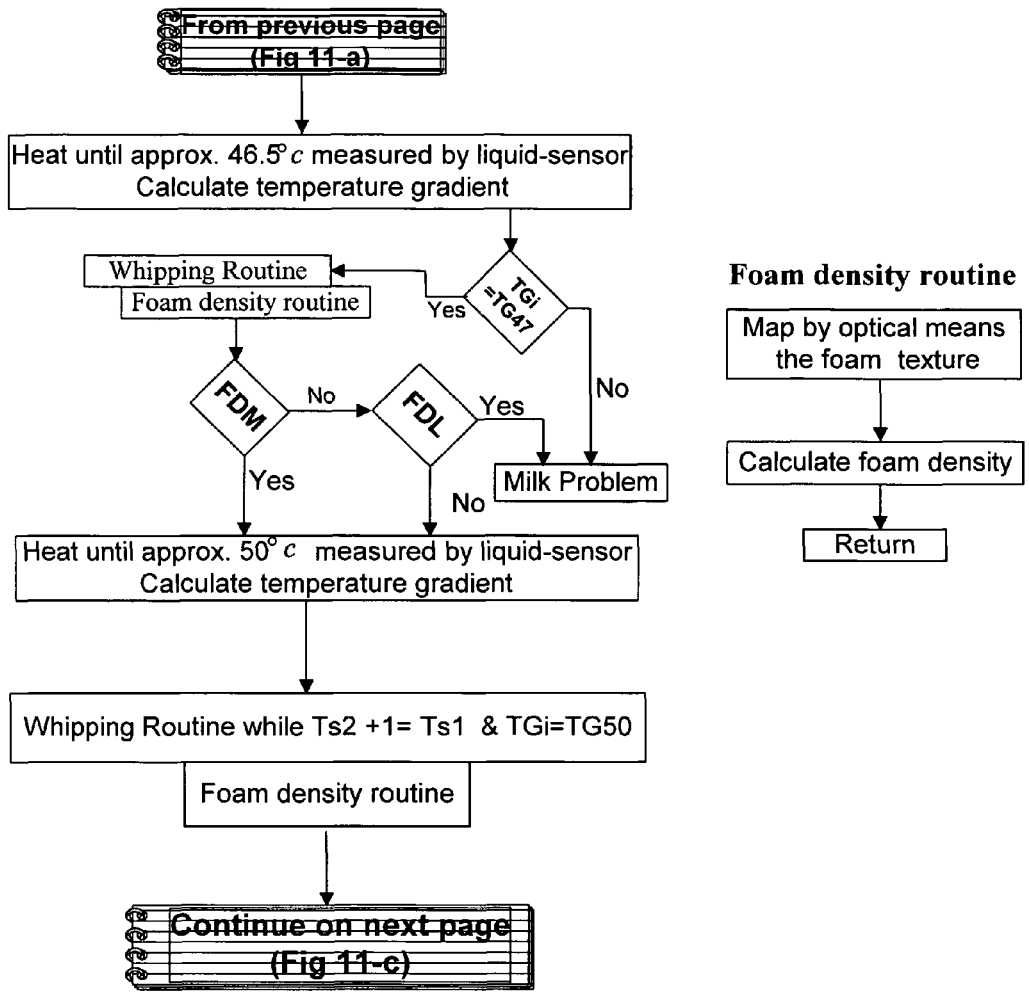
FIG 11-b

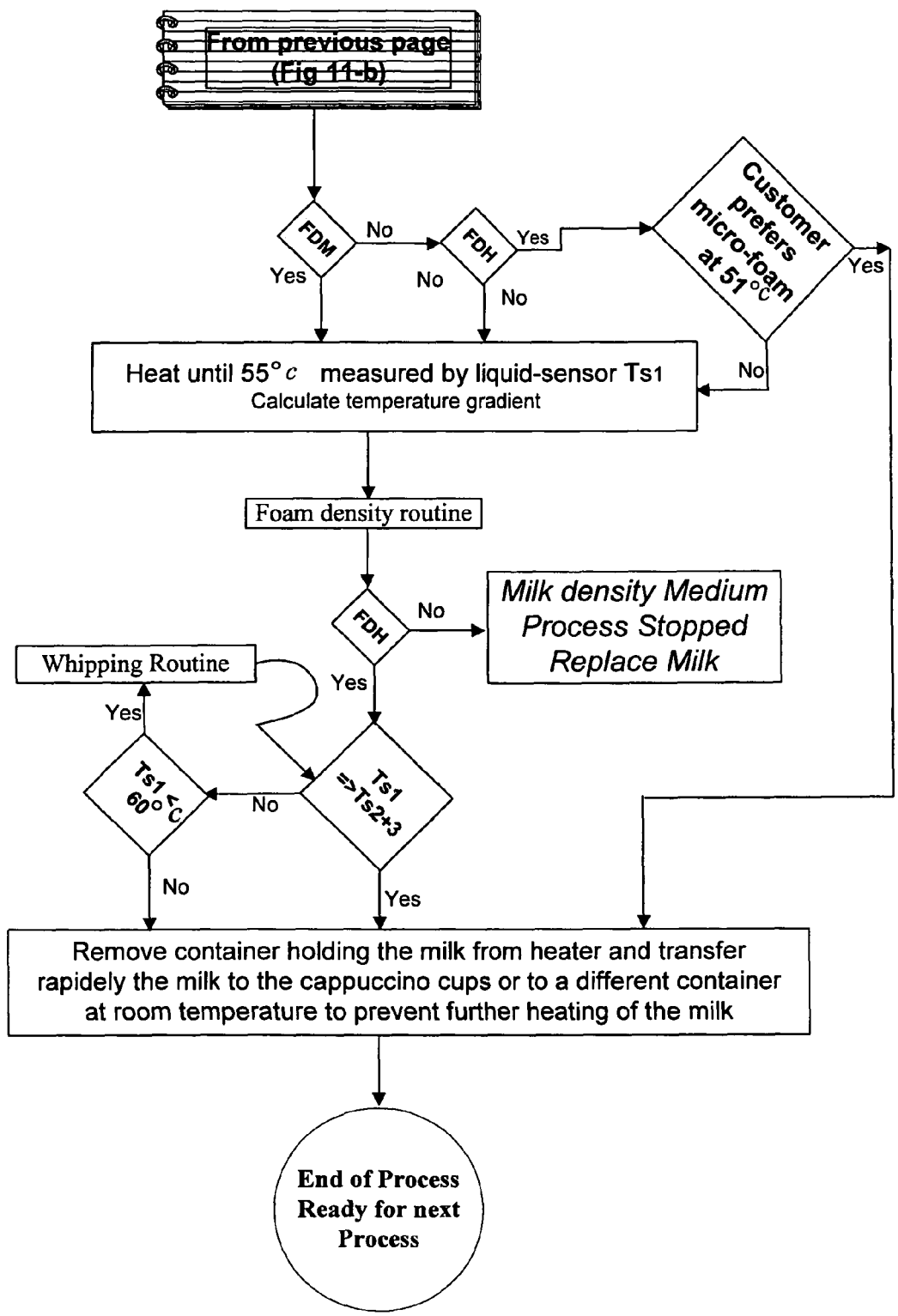
FIG 11-c

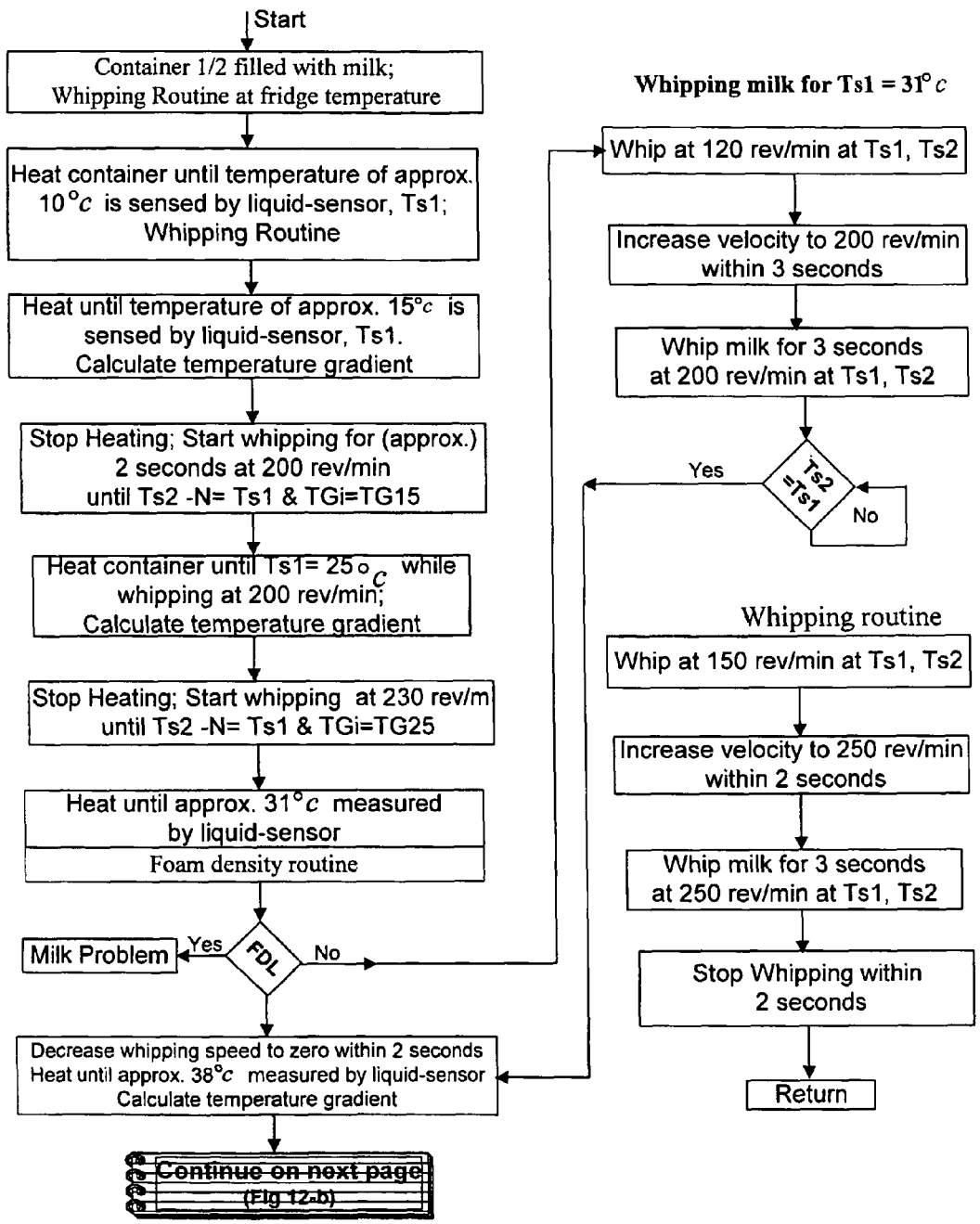
FIG 12-a

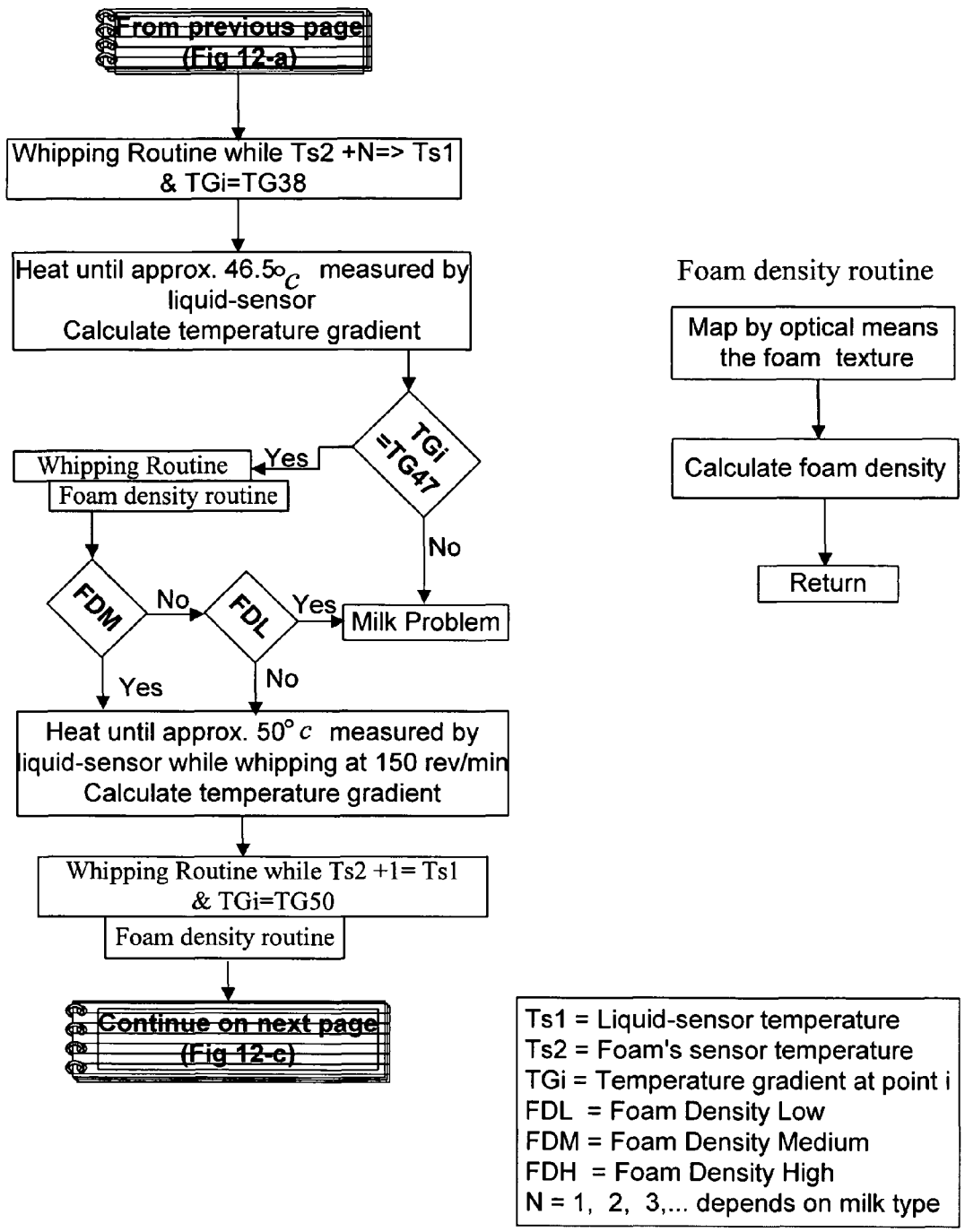
FIG 12-b

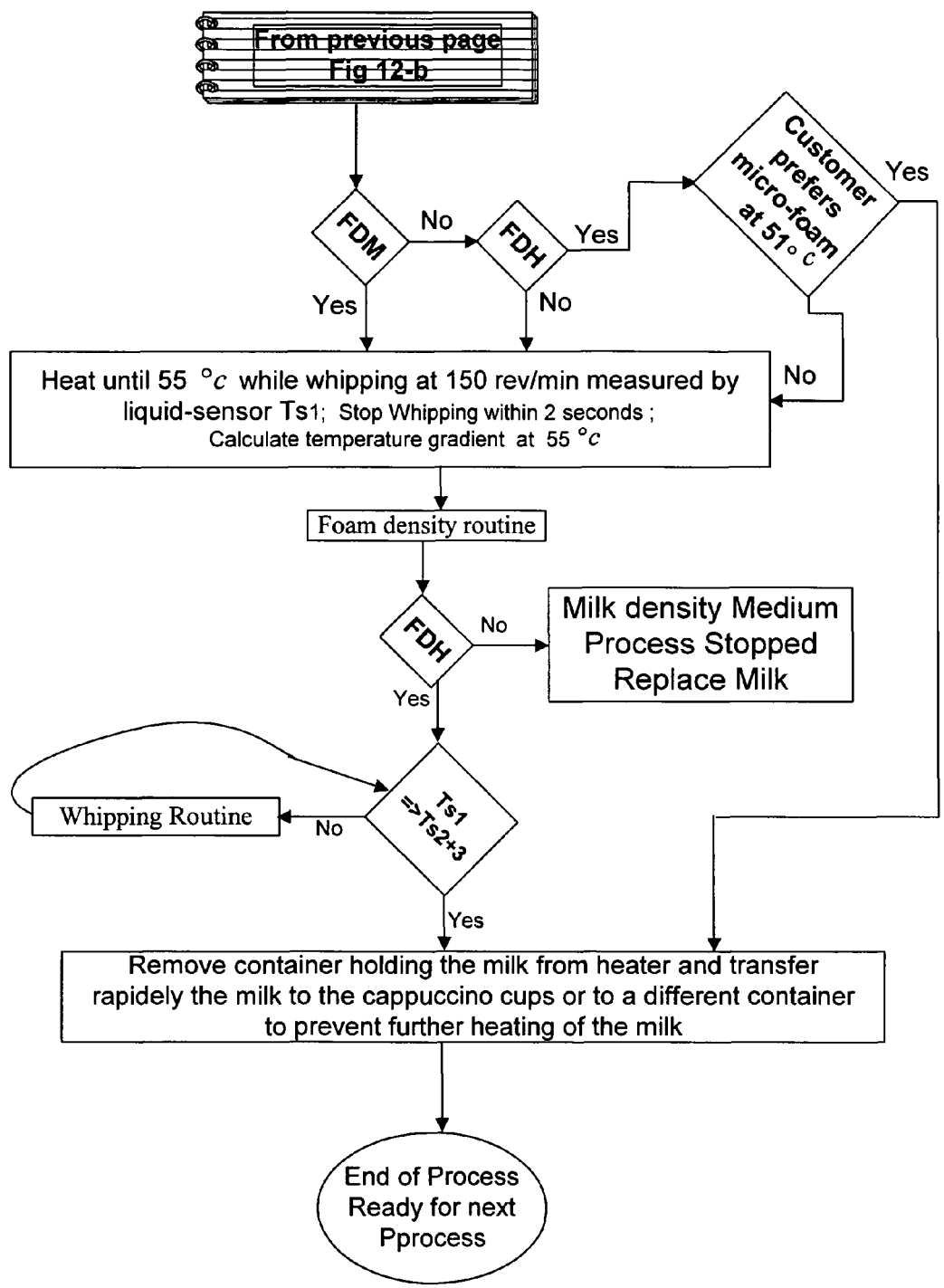
FIG 12-c

METHOD FOR PREPARING MICRO-FOAM WHIPPED MILK FOR CAPPUCCINO OR A METHOD FOR WHIPPING OTHER LIQUIDS CONTAINING PROTEINS, USING AN APPARATUS

This application claims priority of provisional application 61/573,548 filed Sep. 1, 2011.

TECHNICAL FIELD

Embodiments of the present invention relate generally to systems and methods for preparation of micro-foam whipped milk or other liquids.

BACKGROUND

Today's commercial/industrial coffee makers generally require a professional coffee machine operator. These are generally electrically powered devices that are heavy, large bar's space consuming, difficult to move, require a permanent water connection, are mechanically complex, and require frequent maintenance. The production of whipped milk is accomplished using steam operated, with the results (in terms of consistency, bubble size, homogeneity, viscosity, and the like) depends on the particular operator's skills.

Industrial coffee catering is expensive, and sometimes not possible due to water and electricity requirements. Home hospitality would benefit from high quality and tasty coffee, (espresso or cappuccino), which are usually one or two cups at a time. Guests are not generally offered cappuccino due to the time and effort involved in the process. The "coffee boy" is employed for several minutes per cup, while being absent from the guests table.

The currently employed method of processing milk foam is based on the heating of the milk using hot steam. This process is controlled manually and the quality of the milk foam is very much affected by the proficiency of the user and requires a specific combination of adequate heating process and specialized usage of the steam. Steam frothing of milk is obtained by injecting steam to heat the milk while injecting air into the milk. Both the temperature of the milk and the foam are important for a good result. Milk will not froth well if the milk is foamed. Unfortunately, milk sometimes fails to foam during the injection of steam and hence cannot be used for making cappuccino. Poor steam frothing may be caused for example, by excess water in the milk which changes the milk thickness, changes the coffee\milk ratio, and has an effect on frothing. Too much or too little milk fat content likewise affects frothing although skim milk generally gives more froth than milk containing milk fat; however, the froth in skim milk is less dense and subsides faster. In running a traditional espresso bar, a serious limitation is the rate at which the operator can steam and froth milk—not the rate at which one can brew espresso. Adding an Automatic Milk Whipping Appliance to the existing traditional espresso machine will significantly enhance its performance and allow replacement of the skilled operator with an unskilled person.

The present coffee catering industry prefers to serve brewed coffee; few companies use modern automatic espresso and cappuccino machines for serving a limited number of guests due to the very high cost; no micro-foam capability as explained in this application. Such machines are very expensive, don't need a water connection or special electrical outlets but have limited capability to service hundreds of guests with cappuccino in short times.

BRIEF SUMMARY

The invention comprises a fully automatic combined espresso and milk system. This system consists in some embodiments of one or more standalone milk whipping appliances, and computerized electrical espresso makers under development, are not subject of this application. The combined device is suitable for commercial industry and home hospitality alike. The milk preparation process uses pure milk only; viscosity varies from fluid to foam upon user. The performance of the automatic appliance is similar to the performance of a skilled barista, but is of absolute repeatability given standard ingredients. The device is of reduced size compared to existing coffee machine sizes, and likewise maintenance and cost are reduced. The device raises the quality standard of cappuccino anywhere and allows for new catering options for coffee services.

The fully automatic whipping milk system produces properly textured foam at variable temperatures between approx. 20 to 60 Celsius degrees. The process does not use high pressure steam (which may reach higher than 100 Celsius degrees, thus affecting those milk particles in the neighborhood of the froth assistor of the espresso machine for example by denaturing the proteins of the milk). The new process incorporates air into the milk by whipping to an extreme fineness, introducing a consistent and unusually fine distribution of bubbles that improve and significantly sweeten the taste; that is what makes ordinary milk extraordinary.

DRAWINGS

Figure 2:
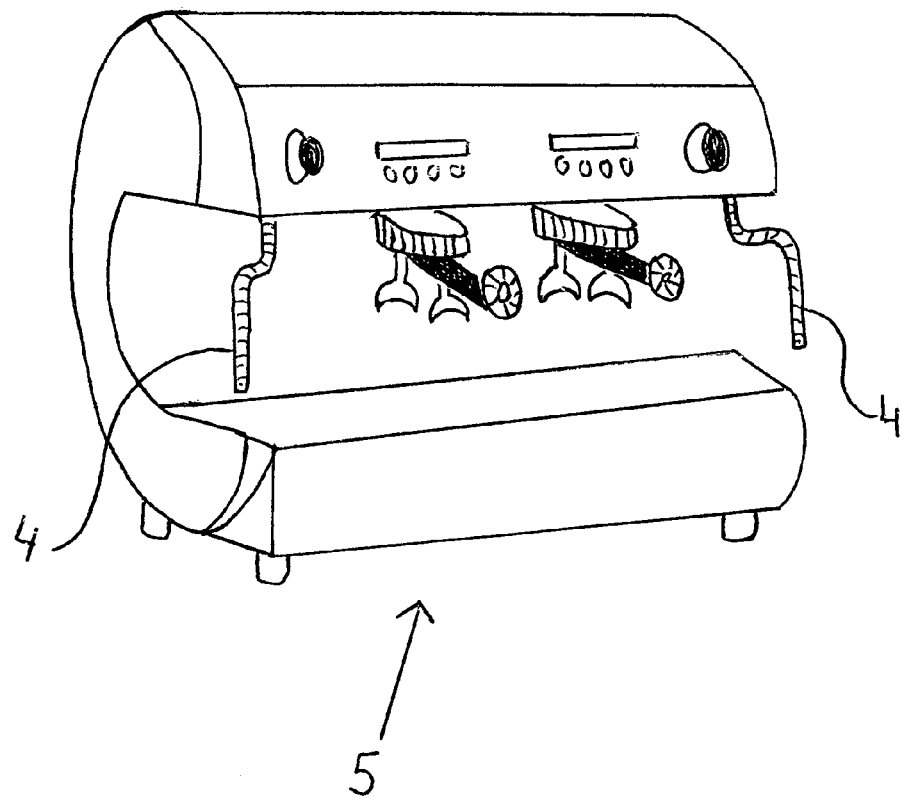
Figure 3:
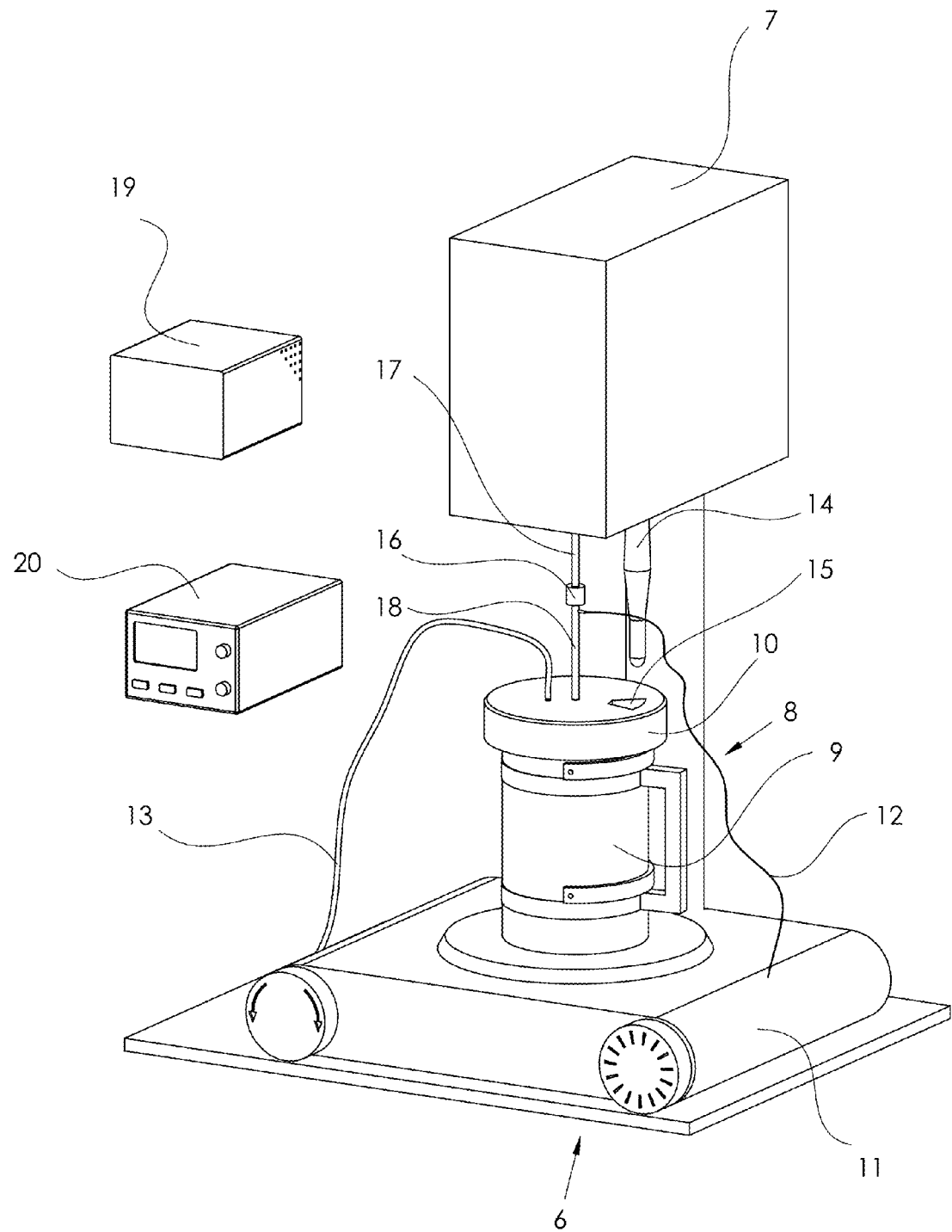
Figure 4:
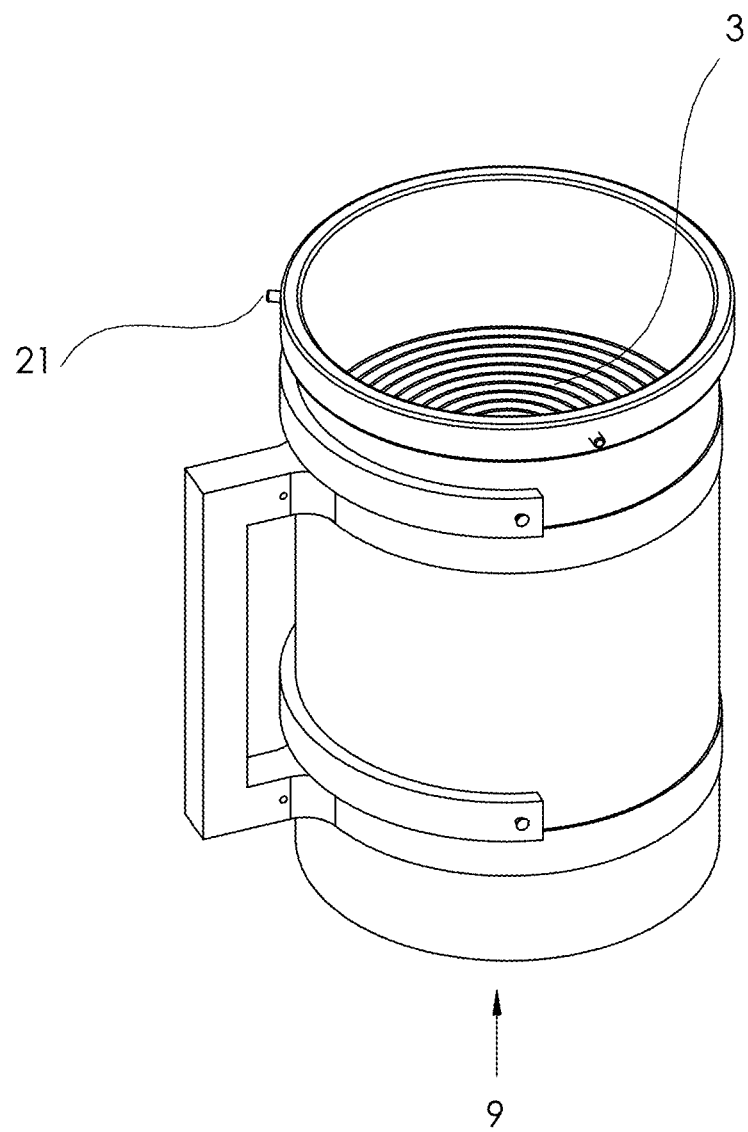
Figure 5:
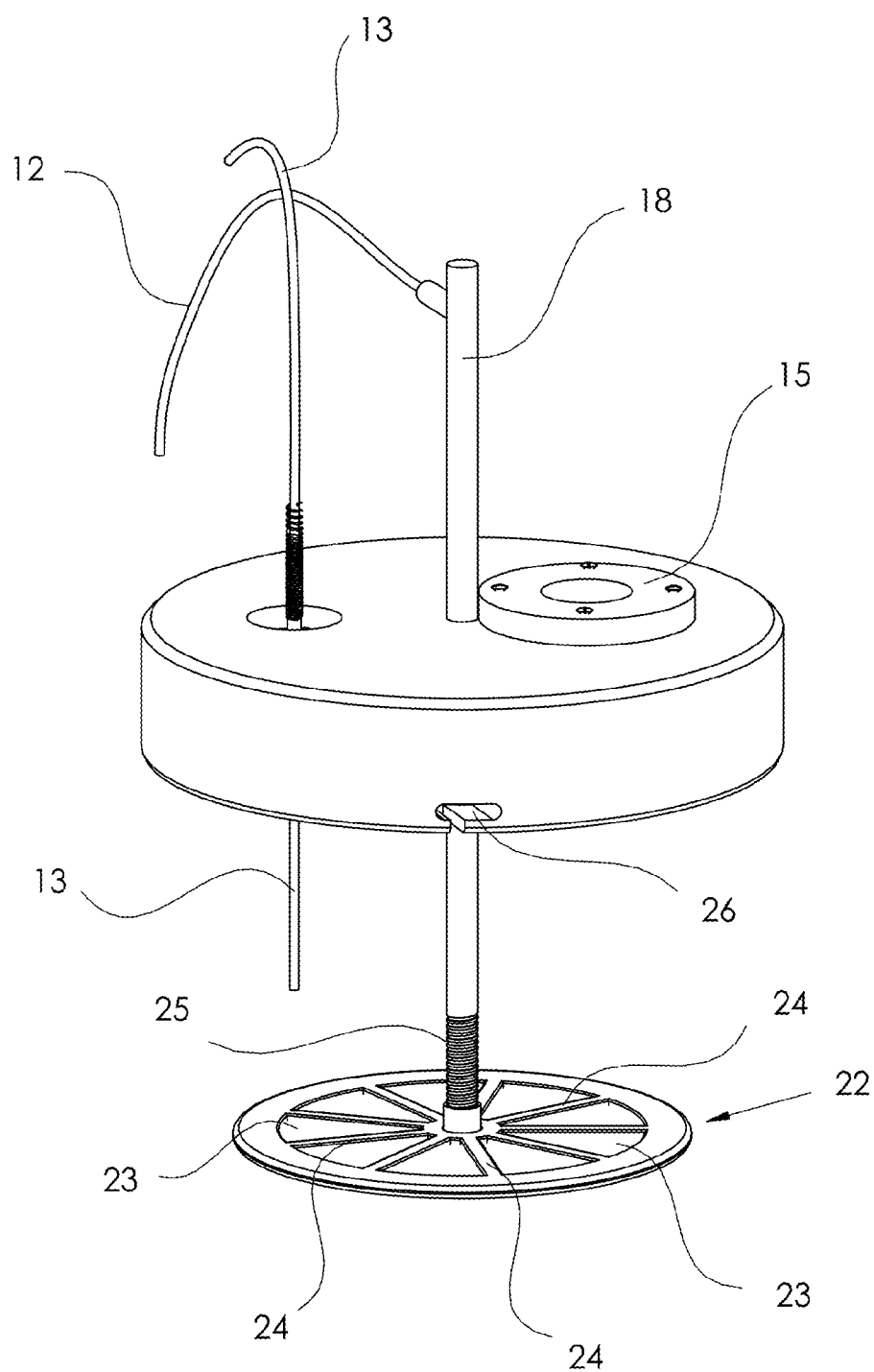
Figure 6:
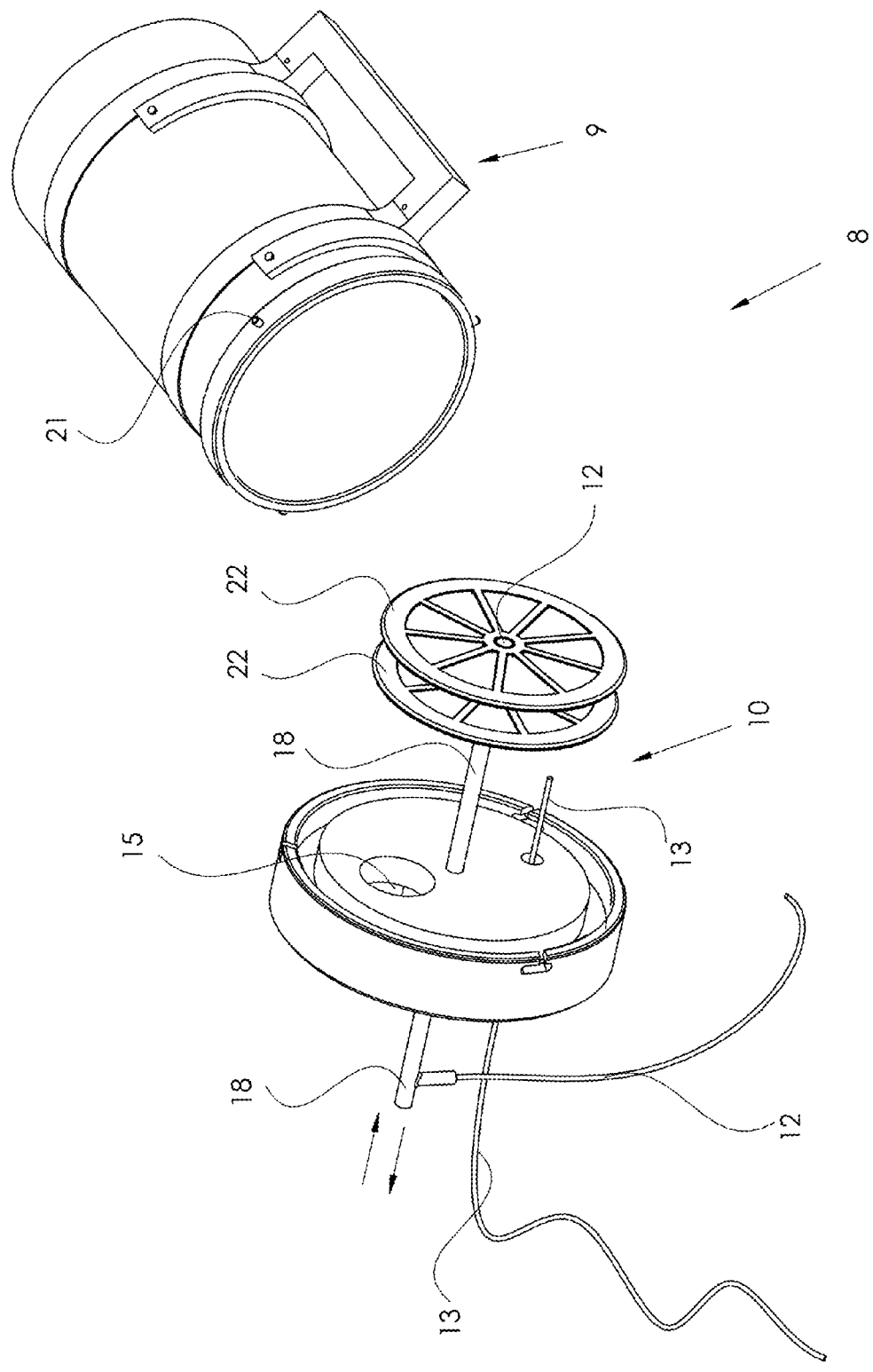
Figure 7:
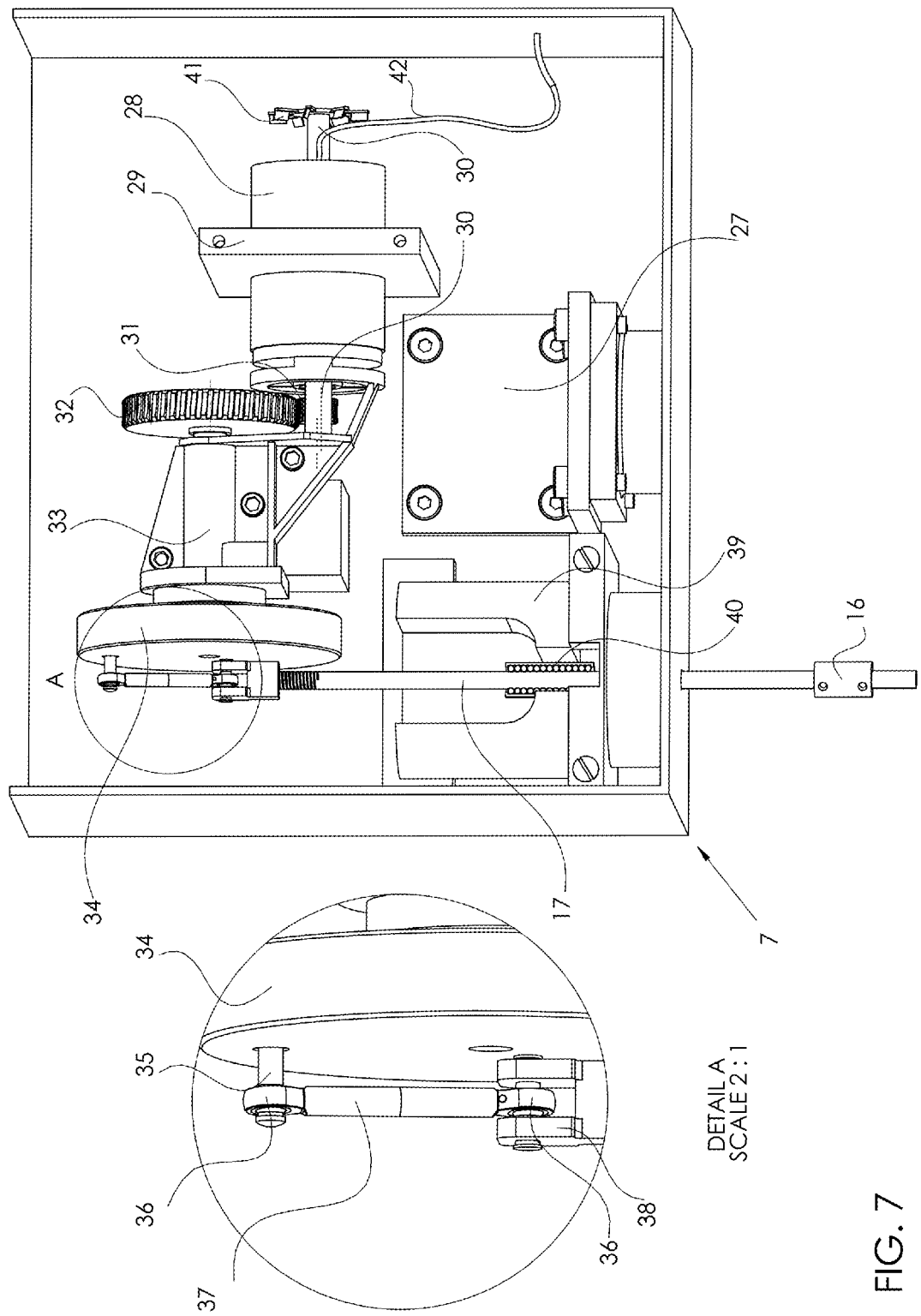
Figure 8:
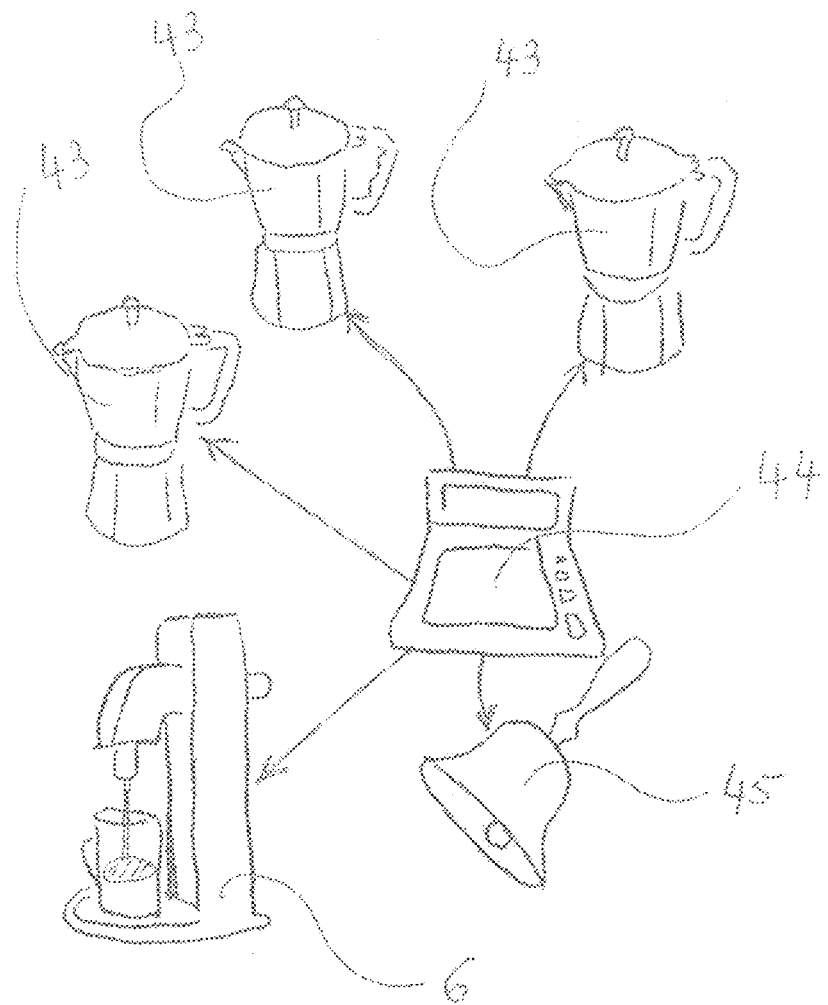
Figure 9:
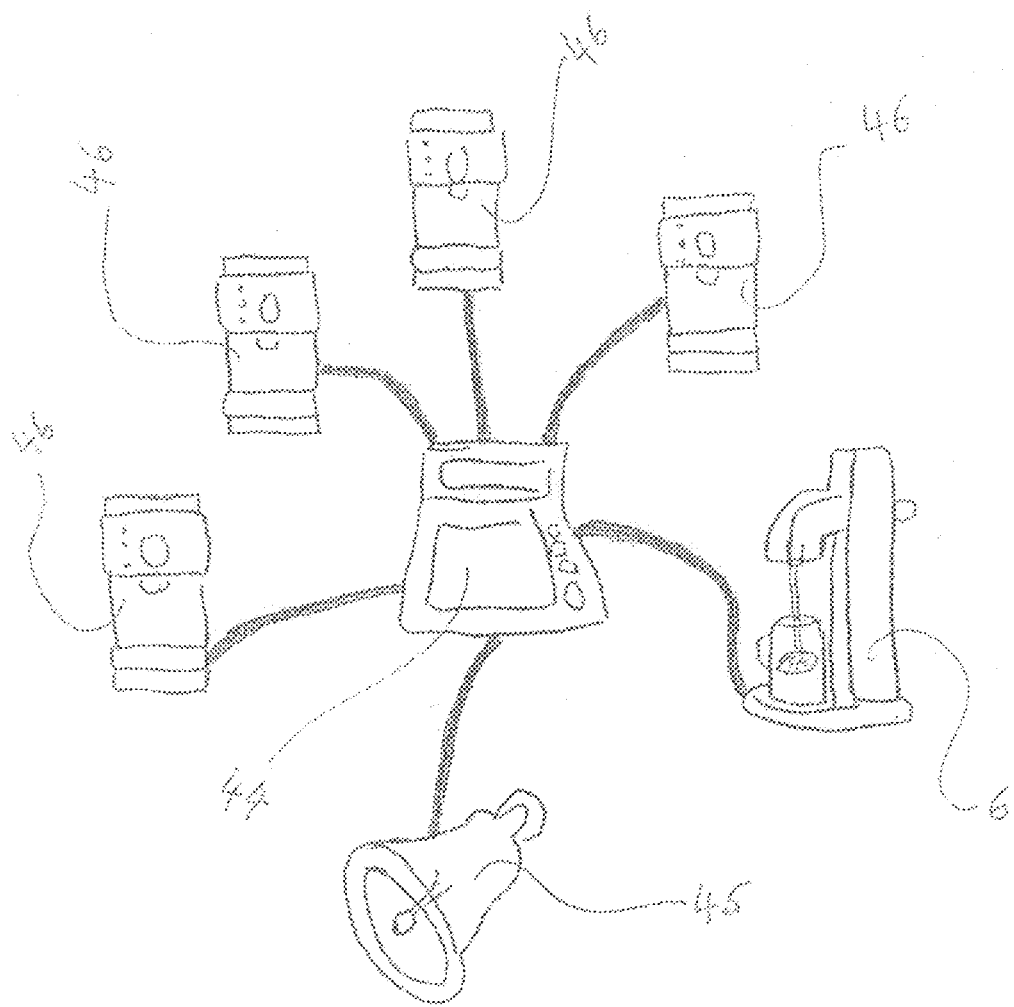
Figure 10:
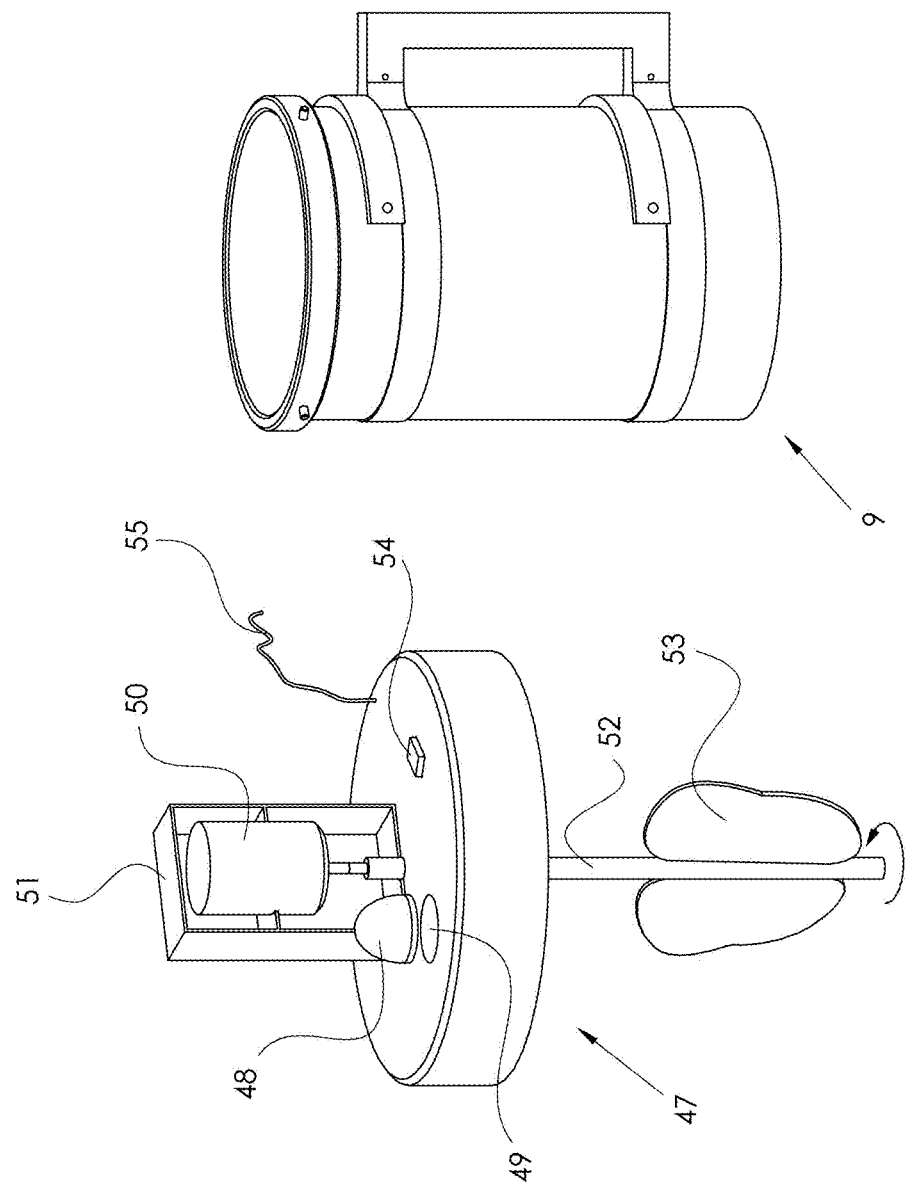
Figure 13:
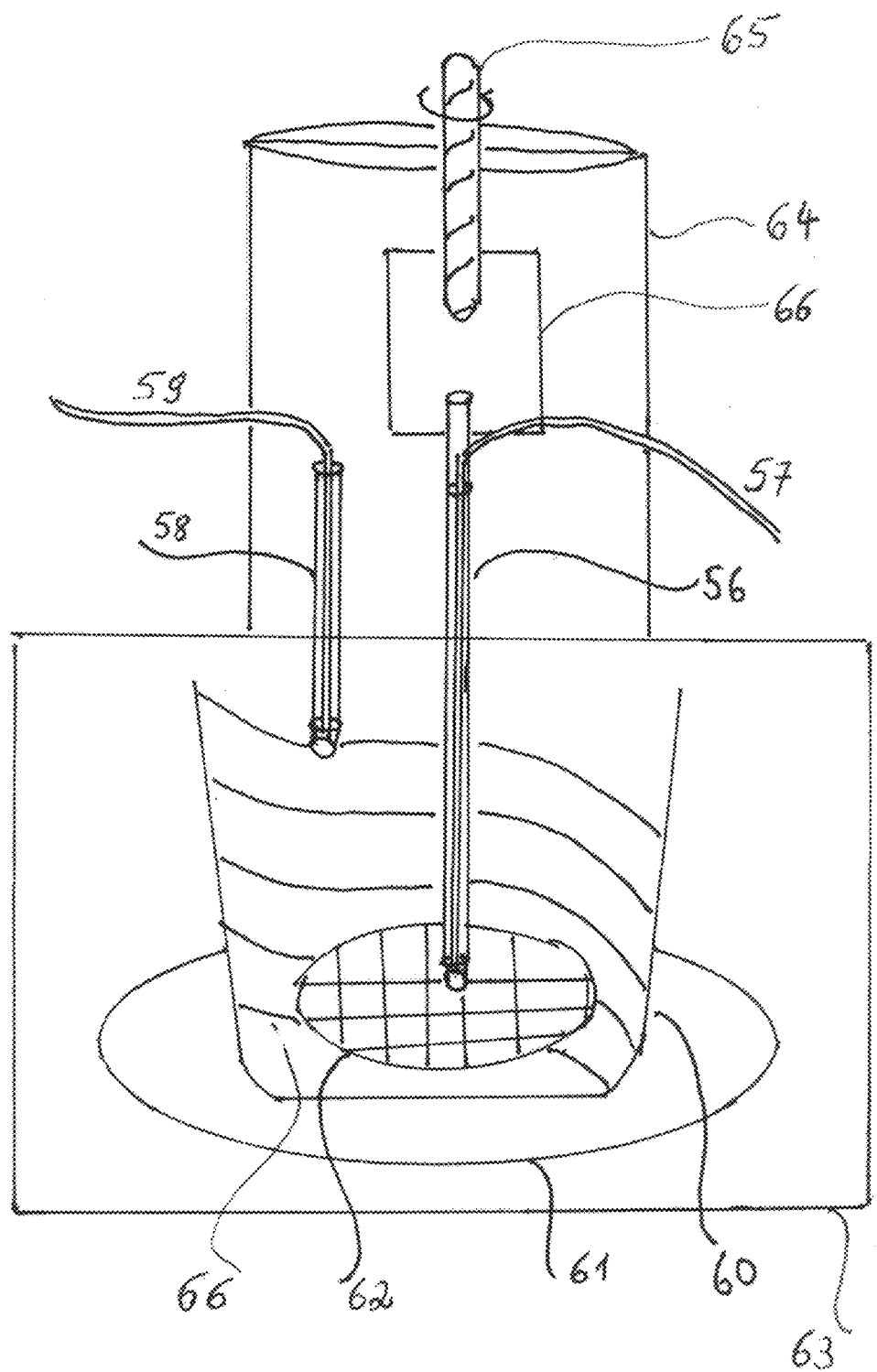

FIG. 1 The present frothing milk technology at the commercial bar
FIG. 2 A traditional industrial espresso machine
FIG. 3 An automatic milk whipping machine
FIG. 4 Liquid container
FIG. 5 A liquid container's cover
FIG. 6 A liquid container and a milk cup cover
FIG. 7 The main part, shows the electromechanical means that cause the reciprocal move of the user shaft
FIG. 8 Stovetop Catering system
FIG. 9 Hospitality system
FIG. 10 Container cover for stirring
FIGS. 11a,b,c Block diagram of the whipping milk process to prepare Israeli milk 3% for cappuccino.
FIGS. 12a,b,c Block diagram of the whipping milk process to prepare USA milk 2% reduced fat for Cappuccino.
FIG. 13 Micro-Wave version of the micro-foam maker

LEGEND FOR DRAWINGS 1 human hand
2 milk pitcher
3 milk
4 froth assistor
5 industrial espresso machine
6 an automatic milk whipping machine
7 main part
8 a working liquid cup
9 liquid container
10 liquid container cover
11 heater
12 liquid temperature sensor
13 foam temperature sensor
14 optical means
15 window
16 interconnection means 17 user shaft coming from main part 7
18 working shaft within the container
19 driver and computing means
20 user Interface
21 closing pin
22 whipping wheel
23 net
24 net holding means
25 wheel screw thread
26 closing adjuster
27 main part holding means
28 motor
29 motor housing
30 motor shaft
31 motor shaft wheel
32 torque motor transmission wheel
33 gear
34 motion transmission wheel
35 transmission pin
36 rod end joint
37 interconnection shaft
38 interconnection transmission
39 shaft leading means
40 linear bearings
41 cooling means
42 electrical cord
43 electrical stovetop coffee machine
44 computerized multiuser interface
45 bell
46 espresso machine
47 container cover for stirring
48 capsule
49 capsule housing
50 stirring motor
51 stirring motor housing
52 stirring shaft
53 blender
54 operating switch
55 electrical cord
56 fiber-optic liquid temperature sensor—pipe
57 fiber-optic liquid temperature sensor
58 fiber-optic foam temperature sensor—pipe
59 fiber-optic foam temperature sensor
60 Vessel for micro-wave
61 rotating plate
62 micro-wave whipping wheel
63 micro-wave oven
64 motor for microwave
65 motor's (64) axle
66 Coupling mw
67 liquid mw

DETAILED DESCRIPTION

In the following detailed description, numerous specific details are set forth in order to provide a thorough understanding of embodiments of the present invention. However, those skilled in the art will understand that such embodiments may be practiced without these specific details. Furthermore just as every particular reference may embody particular methods, systems, yet not require such, ultimately such teaching is meant for all expressions notwithstanding the use of particular embodiments. Reference throughout this specification to "one embodiment" or "an embodiment" means that a particular feature, structure, or characteristic described in connection with the embodiment is included in at least one embodiment of the invention.

The term 'plurality' refers hereinafter to any positive integer greater than one (e.g, 2, 5, or 10).

The term 'micro foam' refers hereinafter to a foam having an average pore size of 0.1 mm or less.

The device consists in simple embodiments of a set of perforated disks which are made to undergo reciprocating motion within a vessel containing milk or other liquid, by means of a reciprocating shaft to which the disks are attached. By means of whipping these disks at specific velocity profiles, and heating the liquid simultaneously with specific heating profiles (of temperature vs. time), in conjunction with use of feedback concerning liquid temperature, foam temperature, and foam density, precisely controlled foam consistency can be achieved by the method and device associated therewith.

FIG. 1 shows a worker holding with his hands 1 a milk pitcher 2 for frothing milk 3 that is heated by steam flowing via the froth assistor (aka steam wand) 4 belonging to the traditional industrial espresso machine (5 in FIG. 2). The heat is sensed by the worker's right hand (FIG. 1) or using (not shown) a thermometer.

In contrast to this manual operation with its attendant variability, the apparatus seen in FIG. 3 will allow a high quality of milk foam making using a fully automated process, at lower energy consumption, using pure milk only. The apparatus may accept milk in various forms: powder or capsules containing powder or liquid milk used at commercial, catering or domestic facilities. The apparatus will serve as an automatic coffee whipped micro-foam milk maker for the commercial user and for the domestic user.

It has been found through careful experimentation that liquids such as milk having a micro-foam structure re characterized by sweeter taste than otherwise, despite the absence of any sweeteners. This has decided benefits for drinks traditionally sweetened (such as coffee with milk), as a large segment of the drinking populace will seek the sweetened taste without sugar based sweeteners.

Many claim to produce "micro-foam" milk; but do not meet the micro-foam definition above. Milk foam prepared according to the method herein disclosed is thick and dense in consistency; the air bubbles are invisibly small (for example being less than 100 microns in average diameter); and the remaining liquid (approx. 80% or less of the total volume) becomes uniform and homogenous. The volume of the ready prepared milk is approx. twice the volume of the milk prior to the whipping process; that volume could be controlled during the process. Actually, this liquid is stretched\enlarged by the whipping process; it probably seems as hosting miniature air bubbles surrendering the milk molecules or penetrating among them. The micro-foam sits atop this liquid, not appreciably changing or aggregating for at least 20 minutes; thereafter after one may observe the air bubbles reaching macroscopic dimensions and growing over time due to aggregation of several bubbles into one.

Due to the long-term stability of the foam, the ratio between the micro-foam layer (volume) and the liquid (volume) formed beneath that micro-foam remains steady until one finishes drinking. There is also no need to stir, as the micro-foam disperses naturally. The sweet taste due to the micro-foam remains steady until the micro-foam changes its appearance due to larger macroscopic air bubbles. A superior micro-foam is obtained at a temperature range of approximately 51 to 60 centigrade depending on the milk type and the temperature gradient measured within the vessel containing the milk; these parameters are part of the current application and have been obtained after extensive experimentation.

Cappuccino produced using the method outlined above has a sweet natural taste, with no need for sugar. The micro-foam milk produced by the method reduces to regular milk after more than 30 minutes; this milk can be put into the refrigerator and reused for an additional whipping process.

Scientists studying the phenomenon of sweetening from micro-foam suggest that the proteins within the milk change their molecular form during whipping, but return to the original form over time.

It is important to mention that the best results are obtained from milk that starts the whipping process at lowered temperatures. Starting the process with milk at room temperature, for example, will result with poorer micro-foam milk.

The whipping process can provide a thicker or thinner micro-foam layer, depending upon the amount of heat invested into the process and the whipping profile. A minimum of 51 degrees centigrade, depending upon milk types, will generally be found sufficient.

Referring to FIG. 3, the automatic milk whipping machine 6 contains a main part 7 to produce the mechanical movement for whipping the milk, a working liquid cup 8 that contains the liquid container 9 (wherein the milk 3 is contained) and its liquid container cover 10, heater 11 to transfer appropriate heat into the milk whipping process, liquid temperature liquid temperature sensor 12 to measure temperature within the liquid during whipping, foam temperature sensor temperature sensor 13 to measure the temperature of the foam, optical means 14 to measure the temperature from an external source such as infrared means via an appropriate window 15, interconnection means 16 to connect between the user shaft belonging to main part 7 and the working shaft 18 reciprocating within the working liquid cup 8, driver and computing means 19 and the user interface 20. The computing means 19 include a computerized electronic control unit to control the moving elements, sensory and user's functions controlling the applied heat sequence produced by the heating element. The computerized unit includes communication means, and is capable of sharing the apparatus status with additional devices that share similar communication means. It is further capable of controlling or being controlled by other devices such as an industrial espresso machine.

FIG. 4 shows the liquid container 9 where the milk 3 is contained in; it is recommended that no more than 50% of its volume be filled with liquid due to, for example, the milk's expansion through the whipping process. The container is made of stainless steel or other appropriate material with an appropriate large heat capacity, and is provided with a closing pin 21.

FIG. 5 shows the liquid container cover 10 (shown in FIG. 3) that contains the liquid temperature sensor 12, foam temperature sensor 13 and a window 15 that allows optical means 14 (shown in FIG. 3) to measure the foam's temperature from a distance, without touching the foam for example by means of infrared measurement. The container's cover contains the working shaft 18 and the whipping wheel 22. The whipping wheel contains a fine net or meshes 23 and the net's holding means 24. Various types of nets, according to functionality requirements, will be used comprising appropriate density of wires, type of material and various net holding means.

As seen in FIG. 6 one or more whipping wheels 22 are attached to the working shaft via the screw wheel thread 25 (FIG. 5) to allow various whipping effects. The closing adjuster 26 cooperates with the closing pin 21 for achieving an appropriate fastened connection of the milk cup cover 10 to the liquid container 9. FIG. 6 shows the working liquid cup 8 that consists of the liquid container 9 and the liquid container cover 10. Liquid temperature sensor 12 is inserted into the working shaft 18 at its distal end close to the whipping wheels 22 to sense the temperature of the liquid at rest or while whipping activity. The working shaft 18 is a tube made of stainless steel or other appropriate material. Foam temperature sensor 13 is inserted via the liquid container cover 10, made of stainless steel to sense the temperature of the foam created while whipping the milk. One or more whipping wheels 22 are attached to the working shaft 18 that reciprocates at controlled amplitude within the milk container 9. The number of whipping wheels 22 may influence the foam's structure depending on the working time and the ratio between the quantities of foam and liquid in the process. The window 15 allows determining the foam's format and density according to its temperature sensed via optical means such as camera or other sensors isolated from the liquid that is being whipped inside the liquid container 9. Closing adjusters 26 located on the liquid container cover 10, for example three adjusters, are located in conjunction with the closing pins 21 located on the liquid container 9, on its outside circumference.

FIG. 7 shows the main whipping mechanical means 7 consisting of the electromechanical working parts that cause the reciprocal movement at controlled amplitude for whipping the milk or other liquid (generally containing proteins). The main part holding means 27 are used to connect main part 7 to the automatic milk whipping machine 6 (shown in FIG. 3). A motor 28 is fixed to a cabinet by its motor housing 29 with its motor shaft 30, for rotational movement. The motor shaft wheel 31 transmits the rotational move to the torque motor transmission wheel 32 to lower velocity and to increase torque. The torque motor transmission wheel 32 is a part of the gear 33.

It will be clear to one skilled in the art that motor 28, wheel 31, transmission wheel 32 which are a part of the gear 33, may be replaced by one unit containing the motor and the reducing gear.

A wheel 34, at the distal end of the gear, is responsible for transforming rotational move into linear movement. The amplitude of the linear movement depends on the wheel's diameter. Detail A shows how the motion is transmitted via transmission pin 35. The diameter is calculated according to the size and volume of the working liquid cup 8 and the required whipping activity performed within a specific process. The location of pin 35 along the diameter of wheel 34 sets the amplitude of the linear move, where the wheel's diameter limits the maximum linear displacement. The transmission pin 35 communicates with a rod end joint 36 where it is free to move in any direction to prevent negative effects on the linear movement. The rotary movement of motion transmission wheel 34 causes the linear movement of the interconnection shaft 37 that ends with an additional rod end joint 36. This rod end joint 36 is connected with an interconnection transmission 38 that is connected at its opposite end with the user shaft 17. The user shaft 17 moves through the shaft leading means 39 and the linear bearings 40 encompassed therefore for an accurate reciprocating move.

It is within provision of the invention that the physical arrangement\location of the motor, gear and transmission means may be rearranged in different combinations as will be clear to one skilled in the art.

The user shaft 17 is then connected to the interconnection means 16 shown in FIG. 3. The automatic milk whipping machine protects the natural lightness of the milk, and produces a creamy milk consistency with variable degrees of the foam density. The apparatus produces low density cream (micro-foam) made of pure milk at variable temperatures. This whipped milk is persistent for a long time of activity, much longer than that produced by standard means. The performance of the apparatus is highly repeatable, in any environment, using all types of regular milk from 0% to high fat milk. The achieved cappuccino, performed by this method, has a sweeter taste than a traditionally made cappuccino, due to the method of the milk preparation process; this sweet taste being equivalent to approximately adding a flat teaspoon of sugar to the traditional cappuccino.

The apparatus whips soy milk or soybean milk and ultra-high temperature (UHT) milk. The result has a taste and look very close to the regular whipped milk.

The apparatus may work continuously without maintenance; it produces abundant quantities quickly, in 2-3 minutes for 4 cups. The apparatus operates automatically at low energy without special electrical 3 phase requirements or permanent water installation.

The catering hospitality service, where a traditional stovetop electrical coffee machine may produce two or more cups of espresso\mocha depends on its volume; for purposes of the present invention such a stovetop electrical coffee machine is connected to a computer for control purposes. FIG. 8 shows a stovetop catering system consisting of three or more existing stovetop electrical coffee machines 43, a computerized multiuser interface 44, and an automatic milk whipping machine 6 that is synchronized with the coffee makers. A sound signal by bell 45 is activated when both coffee and milk are ready for cappuccino.

FIG. 9 shows a hospitality system consisting of four or more existing domestic or commercial espresso machines 46, a computerized multiuser interface 44, an automatic milk whipping machine 6 that is synchronized with the espresso makers and a sound signal activated by bell 45 when both, espresso and milk are ready for cappuccino. Such systems could serve the catering and the fast food industry. The coffee and whipped milk may be self-served or later combined on the guests table. The new coffee system will improve service and save expensive manual labor. The hospitality coffee system is automatically operated without water connection requirements. The system doesn't require any special maintenance, plugs into a standard outlet and is free of manual work of a skilled operator to prepare the cappuccino.

Current espresso machines are expensive with short life spans; require long drink preparation time and a skilled operator to obtain froth milk, sometimes without success and generally with a high degree of variability from cup to cup or at least operator to operator.

The home hospitality coffee system of the invention consists of an electric stovetop coffee maker or a domestic commercial espresso machine, a control system that consists of a computer and an automatic milk whipping apparatus that is synchronized with the coffee maker. A sound signal is activated when both coffee and milk are ready for cappuccino within a few minutes while the traditional "coffee boy" sits at the guests table. Using the home coffee hospitality system or combining a single existing espresso coffee maker with the automatic whipping milk machine will eliminate hospitality limits and encourage people to offer a cup of cappuccino to their guests.

FIG. 10 shows the liquid container 9 and the container cover for stirring 47. The liquid container may be filled with water at an appropriate level and closed with the container cover for stirring 47. A milk powder capsule 48 or powder at a predefined quantity is inserted into the capsule housing 49. A stirring motor 50 is located in the motor housing 51, causing the stirring shaft 52 to rotate and the blender 53 to stir the milk powder until the required milk is obtained. The stirring motor 50 is operated by switch 54 connecting electrical power via the electrical cord 55. The water or the mix of milk powder and water could be optionally heated by apparatus heater 11.

FIGS. 11a,b,c show the whipping milk block-diagram to prepare Israeli cow milk with 3% fat for cappuccino. The working liquid cup 8 is attached to the automatic milk whipping machine 6, where heat is inserted into the milk by the heater 11. The liquid container 9 is at room temperature prior to start of the process. If the milk has been already prepared for cappuccino and the liquid container 9 is hot, then for best results prior to pouring fresh milk into the container, the liquid container 9 should be cooled to room temperature, for example, by pouring flowing water on its external circumference surface for a few seconds.

The milk with three percentage of fat from a cow (for example), taken from a refrigerator at a temperature of approx. 3 to approx. 8 Celsius degrees, is poured into the liquid container 9. The liquid container 9 is covered with the liquid container cover 10. The working liquid cup 8 is then inserted into the automatic milk whipping machine 6 and the heating process starts then after until approx. 10 Celsius degrees is read by the liquid temperature sensor 12.

The following velocity description uses a parameter given in revolutions per minute that is related to the rotational velocity of the motion transmission wheel 34 that transforms the motor's rotational movement to the reciprocal movement of the working shaft within the container 18; this definition is used within the block-diagram in FIGS. 11a,b,c.

The whipping activity starts at a low reciprocating velocity, at approx. 120 rev\min of the motion transmission wheel 34, then reaches approx. 250 rev\min in 3 seconds, then after whips for approx. 3 seconds and stops while reducing the motor's speed within 2 seconds.

The heating continues until approx. 15 Celsius degrees is senses by the liquid temperature sensor and at this point and thereafter, the temperature gradient is calculated.

The whipping activity starts at a velocity of approx. 180 rev\min of the motion transmission wheel 34 for approx. 5 seconds until the difference between the readings of the foam-sensor and liquid-sensor is one Celsius degree and an appropriate temperature gradient is recorded at this point.

Heat is imparted into the container by external heating means (such as a hot plate) until the liquid-sensor reads 25 Celsius degrees and the temperature gradient is calculated; thereafter a whipping activity starts at a low velocity at approx. 180 rev\min for approx. 5 seconds. The whipping continues until the difference between the readings of the foam temperature sensor and liquid temperature sensor is less than or equal to one Celsius degree and an appropriate temperature gradient is measured at this point; the whipping stops reducing the motor's speed within 2 seconds. Heat is inserted into the container until the liquid-sensor reads 31 Celsius degrees, and then the foam density routine is activated where the foam texture is detected by optical means to calculate then after the foam's density. The foam density is low when the milk contains large air bubbles with a small layer of foam or there is no foam at all. The foam density is medium when the milk contains medium to small air bubbles thickened milk with an optional layer of foam on top is sensed. The whipping process causes a stretching process where the volume of milk begins to increase. The whipping process turns large bubbles into smaller ones and later turns the small bubbles into micro-foam. The foam density is high when the micro-foam texture is observed through the entire volume of milk; the foam becomes part of the milk, not just a layer of foam on top of the milk. Testing the foam's density behavior from large bubbles to micro-foam indicates the milk's progress within the whipping process as well as the quality of milk. For example, if milk is not fresh then the whipping process which includes formation of large bubbles and transformation of large bubbles into smaller is poor and micro-foaming will not be achieved. Thus if a low foam density is detected at 31 centigrade than there is generally a problem with the milk.

We now present one example of a suitable whipping routine.

The milk is whipped at a velocity starting at 120 rev\min, increasing until 250 rev\min within 3 seconds and whipping for additional three seconds at 250 rev\min. The whipping continues until there is only a small difference between the readings of the foam-sensor and liquid-sensor, lower than a predetermined threshold.

The whipping speed is then decreased to zero within two seconds; the temperature rises to approx. 38 Celsius degrees as measured by the liquid temperature sensor and the temperature gradient is calculated. A whipping routine is initiated while the difference between the readings of the foam-sensor and liquid-sensor is less or equal to one Celsius degree and an appropriate temperature gradient is recorded at this point. The whipping routine starts whipping the milk at a velocity of 120 rev\min, increases to 250 rev/min within 3 seconds, whips three seconds at 250 rev/min and stops whipping within two seconds. The milk is then heated to approx. 46.5 Celsius degrees and the temperature gradient is calculated; if an appropriate temperature gradient is not obtained at this point than there is a possible milk problem and a probable poor foam structure. The whipping routine is activated followed by the foam density routine. At this point, if the foam density isn't at least medium than there is a problem with the milk; if the foam density is medium or high then the milk is heated until 50 Celsius degrees measured by the liquid-sensor and the temperature gradient is calculated. The whipping routine is then activated while the difference between the readings of the foam-sensor and liquid-sensor is less than or equal to one Celsius degree and an appropriate temperature gradient is recorded at this point; the foam density routine is activated then after. If the foam density is not medium than probably it is high at this point than the milk could be served to someone who prefers milk at approximately 51 Celsius degrees; in case the customer prefers micro-foam at a lower temperature than it is proposes by the apparatus for best micro-foam results, then the liquid container 9 is removed from the heater and the milk for cappuccino from the container is poured directly into espresso cups or is transferred to a different room temperature container to prevent additional heating of the milk. The whipping process ends, and a new cycle is ready to start.

For best results the process continues; the milk is heated to approx. 55 Celsius degrees measured by the liquid-sensor and the temperature gradient is calculated followed by the foam density routine. If the foam density isn't high than the process is stopped and fresh milk should replace the present content of the container; this is probably a milk problem.

Heat enters the container until the temperature of the foam-sensor is approx. 3 Celsius degrees lower than the liquid-sensor causing the removal process of the container as explained in next paragraph.

If the temperature difference between the temperature of the liquid sensor and the foam-sensor is lower than 3 Celsius than if the temperature of the liquid sensor is smaller than 60 centigrade, than a whipping routine is performed followed by a new test of the relationship between the temperatures of the liquid and foam sensors. The liquid container 9 is then removed from the heater and the milk for cappuccino from the container is poured directly into espresso cups or is transferred to a different room temperature container to prevent additional heating of the milk. The whipping process ends, a new cycle is ready to start.

The aforementioned processes often refer to specific temperature differences between various points in a liquid; however as these differences depend on the physical location of the sensors within the working cup, the difference between the location of the liquid sensor and the bottom of the container and other parameters such as the material the container is made of or type of heating, a different relationship among above parameters will lead to a different number, and therefore the specific temperature ranges listed are guides, to be interpreted as averages having some standard deviation or indicating the approximate middle of an acceptable range.

The whipping process to prepare cow milk at 3 percentage of fat may be used to prepare whipped milk made of various milk types from cow, goat, sheep or soya with different fat percentage varying from zero to more than four percent; in this case a different sequence of whipping and heat parameters are used. The new parameters include the velocity of whipping, period of the whipping activity at any point or the amount of heat inserted into the liquid container related to a specific time interval between two whipping operations. Best results are obtained using the foam density structure routine. An additional process may be seen in FIGS. 12a,b,c. As will be known to one skilled in the art, concentrated proteins are primary ingredients in a number of sports nutrition, weight management and healthy aging foods available today. One vexing complaint from food manufacturers with this product is poor dispersion into the water (or other formulation liquids such as milk or fruit juice), the powder formulation forming clumps or settling to the bottom of the mixing vessels.

The powder (concentrated proteins) is not well dispersed within the liquid, and creates a chalky or gritty mouth-feel. The taste is poor, and the motivated user drinks "without a choice". It has been found that whipping with the above disclosed invention rectifies these problems and introduces a sweet taste to the now palatable drink. Thus it is within provision of the invention to whip all manner of beverages.

Once the computerized system has learnt the process, defined by the original activity implemented by two sensors, gradient calculations, etc., for an appropriate liquid with known parameters, such as its type, temperature, etc., than it is possible to operate a primitive controlled system containing just one sensor, measuring the temperature, that controls the motor and heater according to the specific learnt sequence. The output may vary where sometimes the result is more delicious and sometimes less.

In certain embodiments of the invention, as seen in FIG. 13, the heating times are drastically reduced by means of use of a microwave heating element. In this case the motor 64 and control means may be located outside the microwave oven 63, while the transmission rod passes through a wall of the microwave. A fiber-optic liquid temperature sensor—pipe 56 contains the fiber-optics liquid temperature sensor 57 and a fiber-optic foam temperature sensor—pipe 58 contains the fiber-optics foam temperature sensor 59 that work inside the vessel for micro-wave 60 located on a rotating plate 61 that is on the oven's floor. Obviously the elements within the microwave in this case must be microwave safe, comprising glass, ceramic or other non-electrically-conducting materials. The microwave whipping wheel 62 reciprocating within the vessel 60 that contains the liquid mw 67 (for example, milk) is connected via coupling mw 66 to the axle 65 of motor 64.

The micro-wave oven cannot always replace the traditional heat source since it is less efficient on fats and sugars. Using it in collaboration with the traditional heating means could provide the required capabilities.

It is within provision of the invention that heating means be provided in the vessel holding the milk during the process, for example embedded within the walls thereof, or the perforated disks and/or transmission rod may be used as heating elements or to hold heating elements.

It should be understood that when reference is made to temperature difference or gradient between the foam and the liquid, this difference depends on the physical location of the sensors within the working cup, the difference between the location of the liquid sensor and the bottom of the container and other parameters such as the material the container is made of or type of heating. A different relationship among above parameters will lead to a different result and hence the temperature difference mentioned is indicative of a typical value and not an exact result for all cases.

It is within provision of the device to utilize a plurality of disks (and not only one as described above). These multiple disks may for instance be mounted upon a common shaft or rod that undergoes periodic motion. The disks could be replaced during the whipping activity depending on the type of liquid; the hole size and density has been found to affect the foam produced, depending upon the original characteristics of the liquid involved. Without being bound bby theory it is posited that the hole size approaches the size of certain proteins in the milk, and that upon passing though pores of comparable size the proteins undergo a physicochemical change such as denaturing which affects the taste and other properties of the foam.

It is further within provision of the invention that the reciprocating shaft undergo rotation as well as translation, possibly simultaneously. It has been found that these combined motions (rotation and simultaneous translation) of the disk being pushed through the milk can enhance the performance of the device in terms of the foam density and taste thereof. The rotating shaft may be for instance connected via a transmission to the wheel 34 having a spoon\leaf at its end to mix the milk.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A method for preparing whipped liquid containing proteins, comprising steps of whipping said liquid with a predefined velocity profile vs. time, obtaining feedback information through one or more temperature sensors and optical means; heating simultaneously said liquid with a predefined sequence of temperature profile vs. time, said sequence using closed loop control based upon said feedback information, whereby micro-foam having a pore size of 0.1 mm or less is formed.

2. The method of claim 1 wherein said liquid comprises milk from sources selected from the group consisting of: cow, sheep, goat, camel, llama, reindeer or other breast fed creature.

3. The method of claim 2 wherein said liquid is in the form of rehydrated powdered milk, or liquid milk.

4. The method of claim 3 wherein said liquid is milk, further incorporating air into said milk by whipping said milk using electromechanical means while heating to form a micro-foam, wherein the viscosity of said micro-foam varies from fluid to creamy foam, said whipping activity being characterized by parameters including velocity, acceleration and amplitude of reciprocating motion of a whipping element; whereby a creamy milk consistency with variable degrees of micro-foam density is obtained.

5. A method for creating whipped liquid having micro-foam structure having a pore size of 0.1mm or less in liquids containing proteins, comprising steps of:
 a. providing a liquid container of high heat capacity containing a liquid to be whipped;
 b. applying heat from a heat source to achieve a predetermined profile of temperature vs. time varying from approximately 20 to approximately 60 Celsius degrees;
 c. whipping said liquid using electromechanical means to produce linear reciprocating motion at a controlled amplitude and frequency;
 d. sensing the temperature of said liquid by means of one or more sensors chosen from the group consisting of: liquid temperature sensor, foam temperature sensor, optical gradient temperature sensor; and combinations thereof;
 e. measuring the temperature gradient inside the liquid container using optical means via a window in said liquid container.

6. The method of claim 5 wherein said liquid is derived from powdered milk by stirring said powder with water to obtain liquid milk ready for whipping according to said method.

7. The method of claim 5 further comprising steps of:
 f. providing a computerized electronic control unit adapted to control the heating profile and reciprocating motion parameters so as to produce a fine foam; said computerized unit being provided with communication means capable of sharing status information with additional devices and controlling them;
 g. calculating the temperature gradient between said liquid and said foam
 h. heating said liquid, said heating being controlled by said control unit, whereby said liquid is heated to a preset temperature according to a predetermined heating profile, during the whipping process;
 i. providing mechanical means to whip said liquid consisting of at least one disc perforated with holes located on the distal end of a shaft undergoing periodic motion, said perforated disks having a diameter within 1mm of the diameter of said liquid container;
 j. varying said linear reciprocating motion's amplitude and frequency to vary micro-foam parameters.

8. The method of claim 5 wherein said electromechanical means to whip said liquid consists of at least one disc perforated with holes positioned at the distal end of a shaft; said perforated discs having particular distributions of holes and hole sizes; said discs fitting closely into said liquid container; said disks being replaceable by other disks of different hole density and size during the whipping process according to the micro-foam requirements.

9. The method of claim 7 wherein said parameters are selected according to the type of milk, said milk's geographical location of origin, and said milk's pasteurization process.

10. The method of claim 9 adapted for Israeli milk of 3% fat, whipping the liquid while imparting heat into the liquid container to form said micro-foam at an appropriate temperature gradient between said liquid and said foam; comprising steps of:
 a. heating the container half filled with milk, from approximately three to approximately 10Celsius degrees, whip at 120 rev/min, increase velocity to 250 rev/min within 3 sec, whip for three seconds and stop whipping within two second, heat until approx. 15 Celsius degrees is sensed by the liquid-sensor, the temperature gradient is then after calculated;

i. whipping for approximately 5 seconds at 180 rev/min until approx. one Celsius degree difference between the foam-sensor and the liquid-sensor measurements and an appropriate temperature gradient;

j. heating until approx. 25 Celsius degrees measured by liquid-sensor and calculating the temperature gradient;

k. whipping for approximately 5 seconds at 180 rev/min until approx. 1 Celsius degree difference between the foam-sensor and the liquid-sensor measurements and an appropriate temperature gradient is calculated;

l. heating until approx. 31 Celsius degrees measured by liquid-sensor and perform a foam density routine as claimed in step j where the optical means map the foam texture and then after calculates the foam density that may indicate a possible milk problem if low;

m. A whipping activity starts at 120 rev/min while the liquid-sensor and the foam-sensor measure the temperature; then increase the velocity of whipping to approx. 250 rev/min within approx. 3 seconds and whip additional 3 seconds until the foam-sensor measures a temperature close to the liquid-sensor measurement;

n. the whipping speed is decreased to zero within two seconds and the heat flows into the system until approx. 38 Celsius degrees are measured by liquid-sensor followed by calculating the temperature gradient;

o. a whipping routine starts at 120 rev/min while the liquid-sensor and foam-sensor measure the temperature, increasing the velocity of whipping to approx. 250 rev/min within 3 seconds and whip additional 3 seconds at 250rev/min then stop whipping within two seconds, continuing until one Celsius degree difference is measured between the foam-sensor and the liquid-sensor measurements and an appropriate temperature gradient;

i. heating until approx. 46.5 measured by liquid-sensor and then after calculate and relate the temperature gradient to the value at the relevant temperature that may indicate a possible milk problem if not true;

p. performing a whipping routine as set in step o; calculating foam density routine that maps by optical means the foam structure and calculates the foam density; if the foam density is medium than continue to step k, but if the foam density is not medium than if the foam density is low than it could indicate a milk problem; if the foam density is medium or high than we progress to step k;

q. heat until approx. 50 Celsius degrees measured by liquid-sensor and then after calculate the temperature gradient;

r. the whipping routine as claimed in step o is activated until one Celsius degree difference between the liquid-sensor and foam-sensor measurements and appropriate temperature gradient, followed by a foam density routine as in step j, wherein if the foam density calculated is high then the milk may be used upon customer at this temperature; the system proceeds to step n;

s. heat until 55 Celsius degrees measured by liquid-sensor and calculates the temperature gradient followed by a foam density routine as claimed in step j subject to the proviso that if the foam density is not high than the process is stopped and the milk is replaced; if the foam density is high than the heat flowing into the milk until three Celsius degree difference is detected between the liquid-sensor and foam-sensor measurements; if the temperature is less than 60 centigrade than a whipping routine as claimed in o is performed and the proviso is tested again;

t. removing the container holding the milk and pouring said milk immediately into a room temperature container to prevent further heating of the milk; end of process; ready for next process;

u. The whipping routine starts at 120 rev/min while the liquid-sensor and foam-sensor measure the temperature, increasing the velocity of whipping to approx. 250 rev/min within 3 seconds and whip additional 3 seconds at 250 rev/min then stop whipping within two seconds.

11. The method of claim 5 adapted for cappuccino by means of adding the milk to espresso coffee; said micro-foam milk mixing with the espresso without any required stirring activity; said cappuccino being accompanied with a sweet taste caused by the method of the milk preparing process; said sweet taste being equivalent to adding a flat teaspoon of sugar to a traditional cappuccino.

12. The method of claim 5 using soy milk or ultra-high temperature (UHT) milk, wherein said soy or UHT milk loses its original special smell after said method and has a taste and look very close to whipped cow milk.

13. The method of claim 5 separating foam containing proteins from the rest of the milk's components; wherein said proteins in the form of solid foam cream may be removed by mechanical means, said method to be used to remove proteins from milk prior to sending the remains of said liquid to the sewage system.

14. The method of claim 5 further wherein the micro-foam texture is observed by testing the foam's density progress over time, said progress indicating the freshness of said milk; said progress being characterized by the transition from macroscopic air bubbles to microscopic air bubbles.

\* \* \* \* \*